United States Patent [19]
Trowbridge

[11] Patent Number: 5,515,582
[45] Date of Patent: May 14, 1996

[54] DEVICE FOR REPAIRING A BROKEN WIRE

[76] Inventor: Gerald D. Trowbridge, 34485 Hwy. 93, St. Ignatius, Mont. 59865

[21] Appl. No.: 394,163

[22] Filed: Feb. 22, 1995

[51] Int. Cl.⁶ .................................................. A44B 13/00
[52] U.S. Cl. ........................... 24/370; 24/131 R; 24/373; 24/598.8
[58] Field of Search ........................ 24/370, 373, 374, 24/131 R, 598.6, 598.7, 598.8, 573.4

[56] References Cited

U.S. PATENT DOCUMENTS

| | | | |
|---|---|---|---|
| 312,105 | 2/1885 | Faivre | 24/373 |
| 755,617 | 3/1904 | Cleves | 24/370 |
| 1,325,627 | 12/1919 | Dow et al. | 24/598.8 |
| 2,689,991 | 9/1954 | Fedankiw et al. | 24/370 |
| 3,432,129 | 3/1969 | Santucci. | |
| 5,357,656 | 10/1994 | Trowbridge. | |

Primary Examiner—Victor N. Sakran
Attorney, Agent, or Firm—Cushman Darby & Cushman

[57] ABSTRACT

A repair device is provided for repairing a broken wire. The repair device includes at least one elongated body having first and second hooks at opposing ends thereof, the first and second hooks opening inwardly towards the body. At least one locking member is operatively associated with at least one of the hooks. The locking member has a base portion and wing members extending outwardly from the base portion in opposing directions when disposed in a first position. The wing members are manually moveable from the first position wherein ends thereof are directed away from a longitudinal axis of the base member, to a second, locking position folded upon the wire connected to the at least one hook such that the wire portion is secured between surfaces defining the wing members.

10 Claims, 2 Drawing Sheets

DEVICE FOR REPAIRING A BROKEN WIRE

BACKGROUND OF THE INVENTION

This invention relates to a repair device for repairing a broken wire or the like and, more particularly, to a repair device for fastening ends of a broken wire strand together.

My U.S. Pat. No. 5,357,656, the disclosure of which is incorporated into the present specification, discloses a repair device for stranded wire fence. The device includes a pair of similar elongated bodies defining hooks at each end and a wire nut between the end hook portions. The wire nut is placed on a linear portion of each body before forming the hook ends so that the repair device may not be non-destructively disassembled. To repair a broken fence wire with the conventional device, a loop is formed in a left end of the wire to be repaired and the outer hook of one end portion of the device is inserted through the loop. The associated wire nut is then manually moved over the interconnection of the wire loop until sliding motion of the wire nut is resisted. The wire nut is then manually turned so that threads of the nut engage portions of the loop and hook and the nut is tightened so that the looped wire is fastened securely within the wire nut and the nut covers the opened portion of the wire hook. The other end of the broken wire is similarly fastened to the second body of the device.

The conventional device is effective for particular applications, however, since the nuts are applied to the bodies prior to forming the hooks, a pre-assembly step must be performed, which increases the cost of the device. Further, if a repair device is required that is longer than the two interconnected body portions, several body portions are typically joined at the hook members to provide a longer structure. However, with the longer structure, the nut fastened to the end of the hook which couples the adjacent body is wasted, since it will not be used to lock the broken wire.

Accordingly, it can be appreciated that a need exists to provide an improved repair device for broken wire or the like which is inexpensive, and easily adapted to accommodate repairs requiring a device capable of spanning various lengths.

SUMMARY OF THE INVENTION

An object of the present invention is to fulfill the need referred to above. In accordance with the principles of the present invention, this objective is obtained by providing a repair device for repairing a broken linear member, such as a wire. The repair device includes at least one elongated body having first and second hooks at opposing ends thereof. The first and second hooks open inwardly towards the body. At least one locking member is operatively associated with at least one of the hooks. The locking member has a base portion and wing members extending outwardly from the base portion in opposing directions when in a first position. The wing members are manually moveable from the first position wherein ends thereof are directed away from a longitudinal axis of the base member, to a second, locking position folded upon a linear member connected to the at least one hook such that a portion of the linear member is secured between surfaces defining the wing members.

Another object of the present invention is the provision of the device of the type described, which is simple in construction, effective in operation and economical to manufacture and maintain.

Other objects, features and characteristics of the present invention as well as the function of the related elements of the structure, in combination of the parts and economies of manufacture, will become more apparent upon consideration of the following detailed description and the appended claims with reference to the accompanying drawings all of which form a part of this specification.

DETAILED DESCRIPTION OF THE PRESENTLY PREFERRED EXEMPLARY EMBODIMENT

Figure 1:
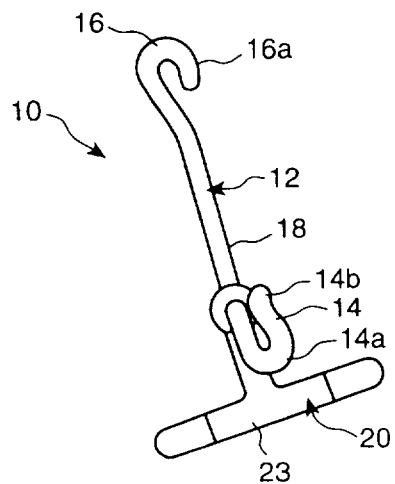
FIG. 1 is an elevational view of a repair device provided in accordance with the principles of the present invention, shown with wing members of a locking member in a first, inoperative position.

Referring to the drawings, a repair device is shown, generally indicated at 10, which embodies the principles of the present invention. The device 10 includes an elongated body, generally indicated at 12, defining a generally elongated hook 14 at one end thereof and a small, more rounded hook 16 at the other end thereof. The hook 14 defines a rounded end portion 14a having an inner diameter somewhat greater than the diameter of the material from which the hook is formed, and an elongate overlapping end portion 14b which extends for a distance along the adjacent linear portion 18 of the body 12. The space between the adjacent surfaces of the end portion 14b and the linear portion 18 of the body is preferably less than the diameter of the material from which the hook is formed, such that when a hook portion of another body 12 is coupled thereto, the device is maintained from accidental dislodgement.

Rounded hook 16 is preferably of circular configuration and defines a channel somewhat larger than the diameter of the body. The end portion 16a of the hook 16 extends adjacent the outer end of the linear portion 18 of the body 12 to define a channel that is preferably somewhat smaller than the diameter of the material from which the body is formed. Hook 16 is formed so as to be in substantially the same plane as hook 14 and preferably in position so that its center will lie on a line extending through the linear portion 18.

The body 12 is preferably formed of semi-rigid, elastically resilient, cylindrical material such as mild steel rod or wire stock. The body 12 is formed of material having a tensile strength greater than a tensile strength of a broken wire, or other linear member to be repaired. The linear member may be a stranded wire such as a strand of barbed wire. However, the device 10 has utility in joining other linear members such as rope and/or cords or the like. The body 12 is preferably capable of conducting electrical current. For example, certain barbed wire fences are electrically charged and it is preferable to repair a hole in the fence by using a repair device which can restore the connection so as to maintain the electrical charge.

For the repair of ordinary stranded barbed fence wire, the body 12 is preferably formed of mild steel wire approximately 4 to 8 gauge.

The overall length of body 12 between hooks 14 and 16 is not critical, but should be sufficient to provide a repair device having a length such that when utilized, the device 10 may be fastened between the ends of a broken linear member with sufficient surplus that the ends of the member may be permitted to be looped about each hook 14 and 16. In the illustrated embodiment, the overall length of the body 12 is approximately 3.50 inches.

Figure 2:
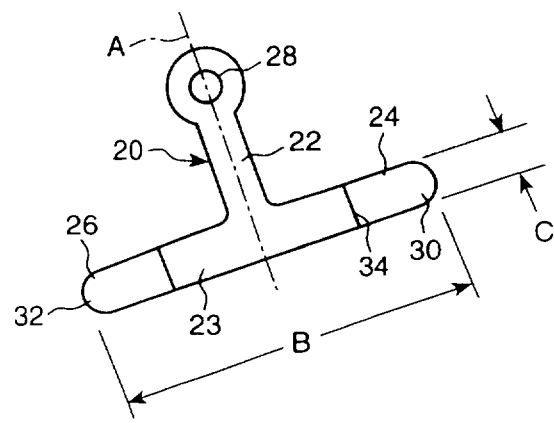
FIG. 2 is an enlarged elevational view of the locking member of FIG. 1.

As shown in FIG. 1, a locking member, generally indicated at 20, is releasably connected to at least one of the hooks 14, 16. In the illustrated embodiment, the locking member 20 is coupled to hook 14. It can be appreciated however, that the locking member 20 may be coupled to hook 16 if desired. The locking member 20 (FIG. 2) is of generally T-shaped configuration having a base portion 22 and a wing portion 23. The wing portion 23 has an overall length B of approximately two inches and a width C of approximately 0.188 inches. The wing portion 23 comprises wing members 24 and 26 extending outwardly from the base portion 22 in opposing directions. The locking member 20 is preferably stamped from sheet metal of approximately 1 mm in thickness so that the wing members 24 and 26 may be manually bent, as will be explained below. The wing members 24 and 26 are disposed generally perpendicular to a longitudinal axis A of base member 22. A proximal end of the base portion 20 includes a bore 28 therethrough which is sized slightly larger than the diameter of the body 12 so as to be fitted thereon, as shown in FIG. 1. Thus, when the wing members 24 and 26 are disposed in a first, inoperative position, ends 30 and 32 thereof are directed away from the longitudinal axis A of the base member 22. In the illustrated embodiment, each of the wing members 24 and 26 includes a scribe or fold line 34 therein to facilitate bending thereof. It can be appreciated, however, that fold lines 34 need not be provided as long as the material comprising the wing members are capable of being manually bent.

Figure 3:
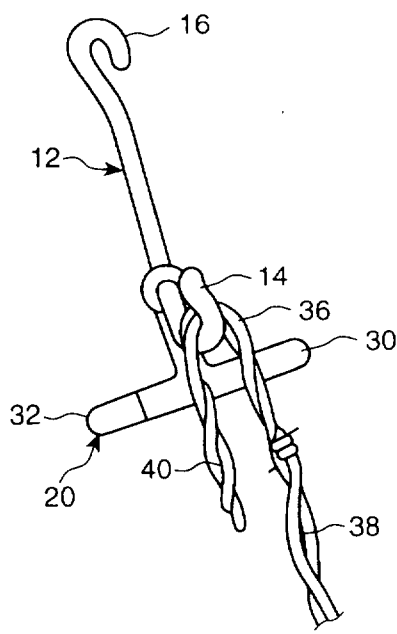
FIG. 3 is a view of the repair device of FIG. 1, shown with a stranded wire looped about a hook thereof.
Figure 4:
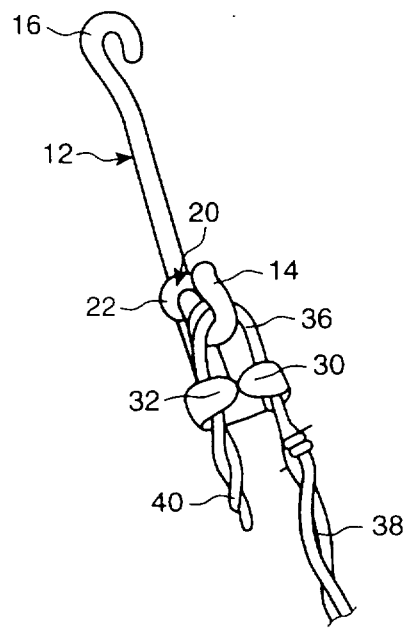
FIG. 4 is a view of the repair device of the present invention, shown with the wing members in a second, locking position securing a stranded wire to the repair device.
Figure 5:
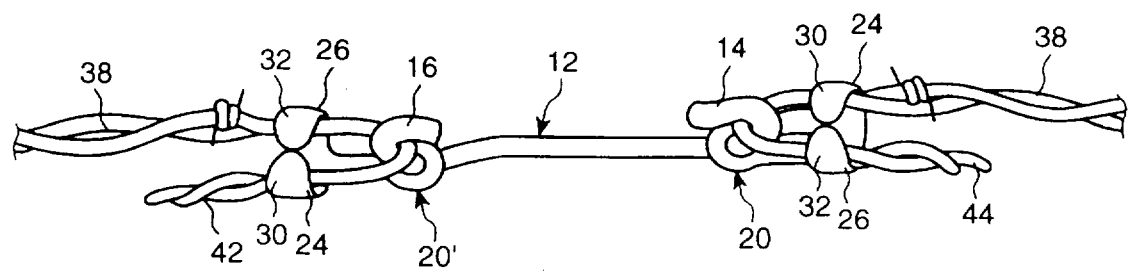
FIG. 5 is a side view of the repair device of the invention shown joining two broken wire ends.
Figure 6:
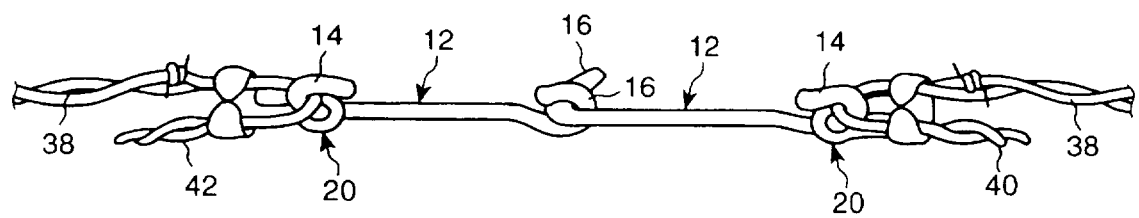
FIG. 6 is a side view of the repair device of the invention utilizing two body members so as to span a greater distance between wire ends to be connected.

The use of the device 10 will be appreciated with respect to FIGS. 4–6. As shown in FIG. 3, a loop 36 of the linear member or wire 38 is placed over hook 14 such that end 40 of the wire 38 is positioned such that it is beyond an extent of the locking member 20. Next, each wing member 24 and 26 is manually moved or bent at the fold line 34 from a first, inoperative position to a second, operative position folded upon a portion of the wire 38 such that the wire portion is sandwiched or secured between the surfaces defining the wing members 24 and 26. As shown in FIG. 4, when the wings 24 and 26 are in their operative locking positions, the ends 30 and 32 thereof are directed toward the base portion 22 so as to face each other in abutting or overlapping relation generally at a point along the longitudinal axis of the base portion 22.

If the break of the wire 38 occurs at a fence stretch post and there is not enough wire to wrap the post, the hook end 16 may be coupled directly to the post. With reference to FIG. 5, if the break occurs elsewhere in the wire 38 such that two wire ends 42 and 44 are formed, a second locking member 20, associated with hook 16 may be utilized, as shown in FIG. 5. End 44 of the wire 38 is looped around hook 14 and the wing members 24 and 26 are moved to their locking position so as to secure end 44 of the wire 38 with respect to the repair device 10. The other end 42 of the wire 38 is attached in a similar manner to hook 16 and secured to the repair device 10 upon bending the wing members 24 and 26 to their locking position.

Figure 7:
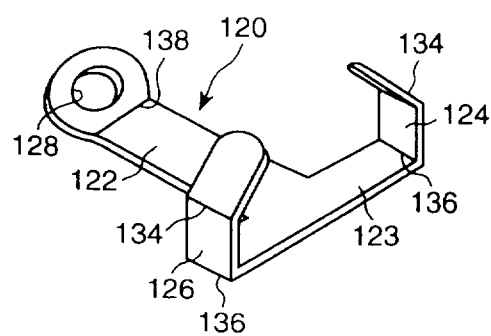
FIG. 7 is a perspective view of a second embodiment of the locking member provided in accordance with the principles of the present invention.

FIG. 7 shows a second embodiment of a locking member provided in accordance with the principles of the present invention. As shown, locking member 120 is identical to the locking member 20, but further includes fold lines 134, 136 and 138. Fold line 138 is provided so as to easily bend the proximal end of the base portion 122 to facilitate coupling that end with a hook via bore 128. The wing portion 123 includes fold lines 134 and 136 which are provided to fold the wing members 124 and 126 about the linear member (not shown in FIG. 7) more easily and thus sandwich or secure the linear member thereto.

When a repair device 10 is required that is longer than a length of a single body 12, a plurality of bodies 12 may be interconnected to provide a longer structure. For example, as shown in FIG. 6, two bodies 12 are joined at respective hooks 16 thereof. Hook ends 14 may then be coupled with the wire 38 in a manner described above. It can be appreciated that if three or more bodies are required to span a particular wire break, hook 16 of one body 12 may be coupled to hook 14 of an adjacent body 12 to further increase the span of the device 10.

It has thus been seen that the objects of the invention have been fully and effectively accomplished. It will be realized, however, that the foregoing preferred embodiments have been shown and described for the purposes of illustrating the structural and functional principles of the present invention and are subject to change without departure from such principles. Thus, the repair device is not limited to the repair of stranded wire such as barbed wire. Other applications of the repair device are also contemplated. For example, the device may be used to repair power lines or the like provided the material used for the locking member and body are of sufficient strength and capable of conducting electrical current. Therefore, this invention includes all modifications encompassed within the spirit and scope of the following claims.

What is claimed is:

1. A repair device for repairing a broken linear member, the repair device comprising:

at least one elongated body having first and second hooks at opposing ends thereof, said first and second hooks opening inwardly towards the body; and at least one locking member operatively associated with at least one of said hooks, said locking member having a base portion and wing members extending outwardly from said base portion in opposing directions when disposed in a first position, said wing members being constructed and arranged to be manually moveable from said first position wherein ends thereof are directed away from a longitudinal axis of said base member, to a second, locking position folded upon a portion of a linear member connected to said at least one hook such that said portion of the linear member is secured between surfaces defining the wing members.

2. The repair device according to claim 1, wherein said ends of said wing members are directed towards said longitudinal axis of said base member so as to face each other, when said wing members are in the second, operative position thereof.

3. The repair device according to claim 1, wherein first and second locking members are associated with a respective hook such that one end of a linear member may be secured by said first locking member and another end of the linear member may be secured by the second locking member.

4. The repair device according to claim 1, wherein first and second elongated bodies and first and second locking members are provided, a first hook of said first body being releasably interconnectable with a first hook of said second body, said first and second locking members being releasably interconnectable with the second hook of an associated body.

5. The repair device according to claim 1, wherein said locking member is of generally T-shaped configuration, said wing members being disposed generally perpendicular with respect to said longitudinal axis of base portion, a proximal end of said base portion including a bore therethrough sized to receive a hook of an associated body, said wing members being constructed and arranged such that when moved to their locking position, said ends are generally adjacent and disposed generally at a point overlapping along said longitudinal axis of said base portion.

6. The repair device according to claim 1, wherein said at least one body is generally cylindrical and formed of rigid material having a strength greater than a tensile strength of a broken linear member to be repaired.

7. The repair device according to claim 4, wherein said T-shaped locking member has a thickness of approximately 1 mm and of material capable of being bent by manual force.

8. The repair device according to claim 2, wherein said at least one body and said first and second locking members are made from material capable of conducting electric current.

9. The repair device according to claim 1, wherein each said wing member includes a fold line therein so as to promote bending.

10. A repair device for repairing a broken wire, the repair device comprising:

at least one elongated body having first and second hooks at opposing ends thereof, said first and second hooks opening inwardly towards the body; and at least one locking member operatively associated with at least one of said hooks, said locking member having a base portion and wing members extending outwardly from said base portion in opposing directions when disposed in a first position, said wing members being constructed and arranged to be manually moveable from said first position wherein ends thereof are directed away from a longitudinal axis of said base member, to a second, locking position folded upon a portion of the wire connected to said at least one hook such that said wire portion is secured between surfaces defining the wing members.

* * * * *